United States Patent
Boes

(10) Patent No.: US 8,038,115 B2
(45) Date of Patent: Oct. 18, 2011

(54) SLIDING SEAT TRACK HAVING A SECONDARY RETAINING STRUCTURE

(75) Inventor: Klaus Boes, Beilngries (DE)

(73) Assignee: Lear Corporation, Southfield, MI (US)

( * ) Notice: Subject to any disclaimer, the term of this patent is extended or adjusted under 35 U.S.C. 154(b) by 133 days.

(21) Appl. No.: 12/369,763

(22) Filed: Feb. 12, 2009

(65) Prior Publication Data

US 2010/0201173 A1    Aug. 12, 2010

(51) Int. Cl.
*F16M 13/00*    (2006.01)

(52) U.S. Cl. ..................................... 248/430

(58) Field of Classification Search ............... 248/430, 248/429

See application file for complete search history.

(56) References Cited

U.S. PATENT DOCUMENTS

| | | | |
|---|---|---|---|
| 2,865,428 A * | 12/1958 | Williams | 248/419 |
| 2,942,646 A * | 6/1960 | Himka et al. | 297/341 |
| 3,524,677 A * | 8/1970 | Louton, Jr. | 297/216.18 |
| 4,068,887 A * | 1/1978 | Babbs | 297/216.18 |
| 4,210,303 A * | 7/1980 | Torta et al. | 248/429 |
| 5,167,393 A * | 12/1992 | Hayakawa et al. | 248/430 |
| 5,192,045 A * | 3/1993 | Yamada et al. | 248/430 |
| 5,322,348 A * | 6/1994 | Johnson | 297/473 |
| 5,358,207 A * | 10/1994 | West | 248/430 |
| 5,445,354 A * | 8/1995 | Gauger et al. | 248/429 |
| 5,575,449 A * | 11/1996 | Shinbori et al. | 248/429 |
| 5,782,138 A * | 7/1998 | Groche | 74/527 |
| 5,855,350 A * | 1/1999 | Volker et al. | 248/430 |
| 5,893,545 A * | 4/1999 | Lyons et al. | 248/420 |
| 6,019,412 A | 2/2000 | Liu et al. | |
| 6,036,253 A | 3/2000 | Garrido | |
| 6,352,312 B1 | 3/2002 | Rees | |
| 6,505,805 B2 | 1/2003 | Fuller | |
| 6,845,956 B2 | 1/2005 | Rohee | |
| 6,874,746 B2 | 4/2005 | Ganot | |
| 7,309,107 B2 | 12/2007 | Smith et al. | |
| 7,314,242 B2 | 1/2008 | Masunaga et al. | |
| 2002/0008183 A1 * | 1/2002 | Mallard et al. | 248/429 |
| 2003/0006355 A1 * | 1/2003 | Horsfield et al. | 248/429 |
| 2003/0230696 A1 * | 12/2003 | Yamada et al. | 248/424 |
| 2004/0056165 A1 * | 3/2004 | Ganot | 248/430 |
| 2004/0200945 A1 * | 10/2004 | Hauck | 248/430 |
| 2004/0238712 A1 * | 12/2004 | Oh | 248/430 |
| 2007/0090263 A1 * | 4/2007 | Yamada et al. | 248/429 |
| 2008/0023613 A1 * | 1/2008 | Brewer et al. | 248/429 |
| 2009/0032670 A1 * | 2/2009 | Yoshida et al. | 248/430 |
| 2010/0006733 A1 * | 1/2010 | Kimura et al. | 248/430 |
| 2010/0219674 A1 * | 9/2010 | Sakkinen et al. | 297/452.18 |

(Continued)

FOREIGN PATENT DOCUMENTS

| | | | |
|---|---|---|---|
| GB | 2014442 A | * | 8/1979 |
| JP | 55008957 A | * | 1/1980 |
| JP | 06191328 A | * | 7/1994 |

*Primary Examiner* — David Dunn
*Assistant Examiner* — David E Allred
(74) *Attorney, Agent, or Firm* — MacMillan, Sobanski & Todd, LLC

(57) ABSTRACT

A seat track includes a stationary rail and a movable rail. The stationary rail has a plurality of windows formed therein and a plurality of tabs formed adjacent to the windows. The moveable rail engages the stationary rail for relative movement in a first direction and for restricted movement in a second direction that is different from the first direction. The moveable rail has a J-hook that cooperates with the plurality of tabs of the stationary rail to restrict relative movement therebetween in the second direction.

10 Claims, 3 Drawing Sheets

U.S. PATENT DOCUMENTS

2010/0327138 A1* 12/2010 Yamada et al. ............... 248/429
2011/0017897 A1* 1/2011 Christoffel et al. ........... 248/429
2011/0057085 A1* 3/2011 Nonomiya .................... 248/429
2011/0057086 A1* 3/2011 Nonomiya .................... 248/430

* cited by examiner

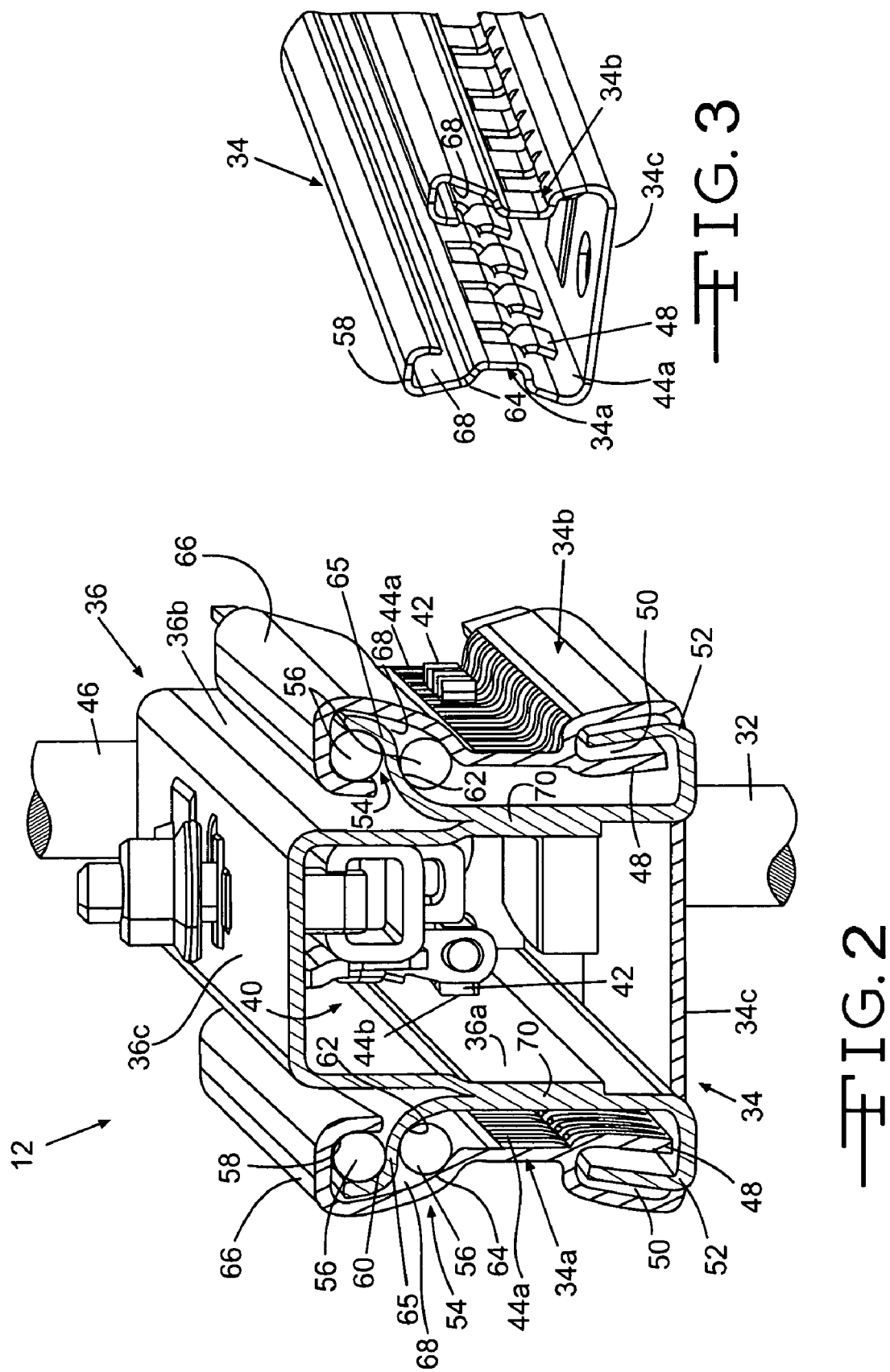

SLIDING SEAT TRACK HAVING A SECONDARY RETAINING STRUCTURE

BACKGROUND OF THE INVENTION

This invention relates in general to a seat track for mounting a seat to a foundation for relative movement therewith. In particular, this invention relates to a relatively moveable seat track having an improved stiffness characteristic and a reduced material thickness.

Seats are provided to carry occupants. The seats may also be equipped with moveable mounting points that accommodate fore and aft movement of the seat, in part, to provide increased seating comfort for the occupant. For example, vehicles are known to be provided with moveable seats for positioning the occupant within comfortable reach of the controls. The moveable mounting points are typically a pair of elongated members, such as rails, that cooperate to form a seat track. One rail of the seat track is mounted to a foundation, floor, or stationary structure relative to the seat. The other rail of the seat track is mounted to a portion of the seat. Slides may be provided to ease movement effort of the seat. The slides may consist of bearings, bushings, or other friction reducing elements.

In certain instances, the moveable and stationary rails of the seat track may be subjected to bending loads or other forces that may cause the rails to deflect or separate. In order to prevent seat track separation, it is known to capture the slide mechanism of the seat track between two overlapping flanges formed in the moveable and stationary rails of the track, as shown in U.S. Pat. No. 6,845,956 to Rohee. Alternatively, cooperating and overlapping sections, known in the art as "J-hook" sections, are employed to prevent seat track separation, as shown in U.S. Pat. No. 6,036,253 to Garrido and U.S. Pat. No. 6,019,412 to Liu, et al. These structures provide adequate retention of the rails of the seat track.

It would, however, be desirable to reduce the weight and cost of these seat track mechanisms. It would further be desirable provide a seat track mechanism having improved stiffness and retention capabilities that employ rails having reduced material utilization.

SUMMARY OF THE INVENTION

This invention relates to a seat track assembly having a stationary rail and a movable rail. The stationary rail is adapted to engage a portion of a seat assembly and the movable rail is adapted to engage a support structure. The movable rail engages the stationary rail for relative movement therebetween in a first direction and for restricted movement in a second direction that is different from the first direction. The stationary rail includes a plurality of windows formed therethrough and at least one tab in engagement with the stationary track. The movable rail includes a J-hook that cooperates with the at least one tab to allow relative movement between the stationary rail and the movable rail in a first direction. The J-hook and the at least one tab cooperate to restrict movement of the movable rail relative to the stationary rail in a second direction that is different from the first direction.

Various aspects of this invention will become apparent to those skilled in the art from the following detailed description of the preferred embodiment, when read in light of the accompanying drawings.

BRIEF DESCRIPTION OF THE DRAWINGS

FIG. 2 is a perspective view, in partial cross section, of a first embodiment of the seat track assembly of FIG. 1.

FIG. 3 is a perspective view of a stationary rail of the seat track assembly of FIG. 2

DETAILED DESCRIPTION OF THE PREFERRED EMBODIMENTS

Figure 1:
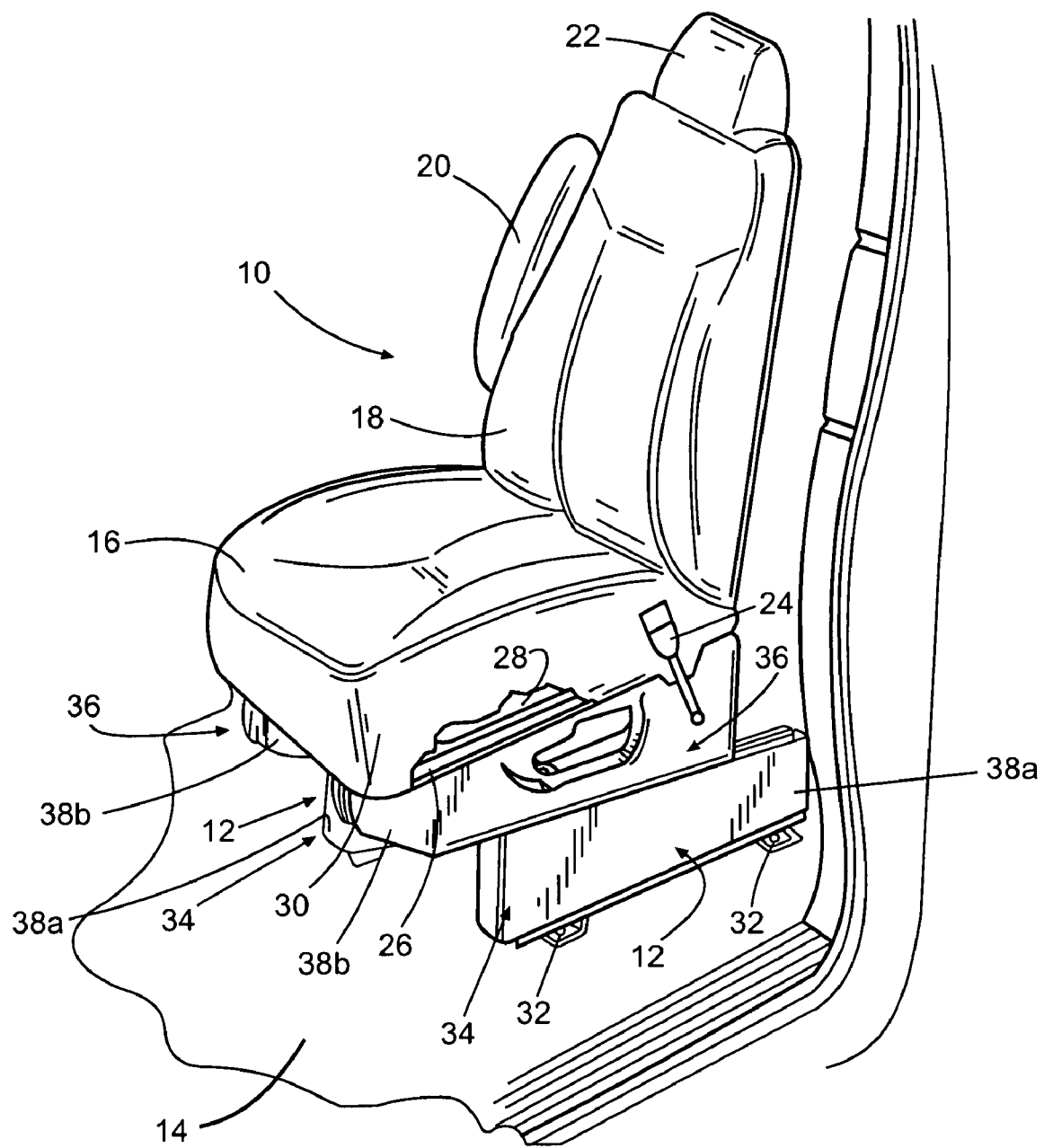
FIG. 1 is a perspective view of a seat assembly, in partial cross section, including a seat track assembly.

Referring now to the drawings, there is illustrated in FIG. 1 a seat assembly, shown generally at 10, having a seat track, shown generally at 12. The seat track 12 will be described in the context of a vehicular seat. However, the various embodiments of the seat track 12 are not limited to vehicular or automotive seats. On the contrary, the seat track 12 may be used in any environment for the purposes described herein. The seat assembly 10 is conventional in the art and may include a seat portion 16 that engages a back portion 18. An armrest 20 and a headrest 22 may be engaged to the back portion 18, though such is not required. The seat assembly 10 may also include an occupant restraint such as, for example, a seat belt 24 anchored thereto. The seat belt 24 may be anchored to the seat portion 16 as shown in FIG. 1, though such is not required. The seat portion 16 includes a seat frame 26, a cushion or filler material 28, and a covering 30. Likewise, the back portion 18, the armrest 20, and the headrest 22 may include one or more of a frame, a cushion, and/or a cover similar to the seat portion 16, though such is not required.

The seat track 12 is engaged between a portion of the seat assembly 10 and an anchoring member 14 that is stationary relative to the seat assembly 10. The anchoring member 14 may include structures such as, for example, a vehicle frame, a cross member, or a floor pan. In the illustrated embodiment, the anchoring member will be described as a vehicle floor 14. A stationary rail 34 of the seat track 12 is anchored to the floor 14 by fasteners such as, for example, bolts 32. However, the stationary rail 34 may be anchored to the floor 14 by any other suitable attachment device or method. The stationary rail 34 has a generally "U"-shaped cross sectional shape, though other shapes may be used if desired.

A first embodiment of a moveable rail 36 of the seat track 12 is anchored to a portion of the seat assembly 10 such as, for example, the seat frame 26, though any other suitable location may be used. In the illustrated embodiment, the moveable rail 36 is anchored to the seat frame 26 by bolts (not shown). However, the moveable rail 36 may engage the seat frame by any suitable attachment device. The moveable rail 36 has a generally inverted "U"-shaped cross sectional shape, though other shapes may be used if desired. The inverted "U"-shape of the moveable rail 36 is positioned inside the "U"-shaped stationary rail 34, though such is not required. Alternatively, the moveable rail 36 may be positioned outside of the "U"-shaped stationary rail 34. The stationary rail 34 and the moveable rail 36 of the seat track 12 may be concealed from view by one or more cover members 38a and 38b, respectively, though such is not required.

Referring now to FIGS. 2 and 3, the stationary rail 34 includes opposed first and second sides 34a and 34b, respectively, and an anchoring side 34c. The anchoring side 34c may be fixed or otherwise secured to, for example, the vehicle floor 14. The moveable rail 36 includes a first side 36a and a second side 36b that cooperate with the first and second sides 34a and 34b, respectively, of the stationary rail 34 for relative movement therebetween. The moveable rail 36 further includes a seat mounting side 36c that is adapted to engage portions of the seat assembly 10, as described above.

The stationary and moveable rails 34 and 36, respectively, of the seat track 12 are shown in FIG. 2 in an engaged and locked arrangement. A position locking mechanism, indicated generally at 40, is shown inside the moveable rail 36. The locking mechanism 40 includes at least one locking tooth or pawl 42 that engages a corresponding locking window 44a formed through the stationary rail 34. The locking pawl 42 and the locking window 44a may be a plurality of pawls 42 and windows 44a, as shown in FIG. 2. The pawls 42 may extend through windows 44b that are formed in the moveable rail 36, as shown in FIG. 2. The orientations of the locking mechanism 40 and the windows 44a and 44b, relative to the stationary rail 34 and the moveable rail 36, may be other than shown if desired. For example, the moveable rail 36 and the locking mechanism 40 may be positioned on the outside of the stationary rail 34. The locking mechanism 40 is actuated by a release mechanism 46. Though illustrated as a vertically extending bar, the release mechanism 46 may be any structure or device, oriented in any relative relationship to the seat track 12. For example, the release mechanism may be mounted in a horizontal position, generally parallel to the floor 14. The release mechanism 46 may also be embodied as a cable pull structure, electromagnetic solenoid, or fluid pressure activated device that is capable of actuating the locking mechanism 40 from a latched position to a released position. The release mechanism 46 selectively extends or retracts the pawls 42 relative to the corresponding windows 44a and 44b. In the illustrated embodiment, such extension or retraction of the pawls 42 from the windows 44a provides for fixed or sliding movement, respectively, of the seat track 12.

The locking windows 44a may be formed through the first and second sides 34a and 34b, respectively, of the stationary rail 34 by any suitable method such as, for example, stamping. Similarly, the locking windows 44b may be formed through the first and second sides 36a and 36b of the movable rail 36 by any suitable method such as, for example, stamping. Though illustrated as generally square or rectangular in shape, the windows 44a and 44b may be any shape desired. When each of the locking windows 44a is formed into the stationary rail 34, a tab 48 is also preferably formed and extends therefrom, as shown in FIG. 2. The tabs 48 extend toward the interior of the stationary rail 34, as best shown in FIG. 3. Additionally, the tabs 48 extend from at least one of the first and second sides 34a and 34b, respectively, of the stationary member 34 and are each bent or otherwise formed toward the anchoring side 34c into a hook. In the illustrated embodiment, the tabs 48 are integrally connected to the windows 44a of the first and second sides 34a and 34b of the stationary member 34. However, the tabs 48 may be singular longitudinal tabs (not shown) that are formed integrally with the first and second sides 34a and 34b, such as by extrusion, or formed separately and attached thereto, if desired. The tabs 48 and a portion of the first and second sides 34a and 34b, respectively, of the stationary member 34 cooperate to define a slot 50 therebetween.

As illustrated in FIG. 2, the first and second sides 36a and 36b, respectively, of the moveable rail 36 each terminate in a catch 52. In the illustrated embodiment, the catches 52 are formed as "J-hook" structures, though other suitable shapes may be used. The J-hooks 52 wrap around the tabs 48 such that the J-hook ends are disposed within the slots 50. The J-hooks 52 and the tabs 48 cooperate to provide a secondary reaction point as will be described in detail below. The J-hooks 52 are free to slide relative to the tabs 48 and the first and second sides 34a and 34b, respectively, of the stationary rail 34. Though shown within the middle of the slots 50, the J-hooks 52 may contact the respective sides 34a and 34b or occupy any space within the slots 50, if desired.

Spaced apart from each pair of the cooperating tabs 48 and J-hooks 52 is a slide, shown generally at 54. The slide 54 may function as the movement contact point between the stationary rail 34 and the moveable rail 36. In the illustrated embodiment, the slide 54 includes a plurality of ball bearings 56 engaging first and second pairs of opposed bearing raceways 58, 60 and 62, 64, respectively, between the cooperating stationary rail 34 and the moveable rail 36, though such is not required. Though shown as spherical elements, the ball bearings 56 may be any shape and made from any material suitable for ball bearing applications. Alternatively, the slides 54 may include sliding elements (not shown) that may further include friction reducing materials, if desired.

The bearing raceways 60 and 62 are formed onto opposite sides of a movable inner race 65. In the illustrated embodiment, one movable inner race 65 extends from each of the sides 36a and 36b of the moveable rail 36. The bearing raceways 58 and 64 are formed onto a stationary outer race 66 that is part of the sides 34a and 34b of the stationary rail 34. The outer race 66 forms a cavity 68 within which the inner race 65 is disposed. The ball bearings 56 are disposed within each of the cavities 68 and in between the cooperating, adjacent bearing raceways of the inner race 65 and the outer races 66. However, any number and arrangement of bearings 56, bearing raceways 58, 60 and 62, 64, inner races 65, and outer races 66 may be used, if desired.

In normal operation, when the release mechanism 46 is actuated, the locking mechanism 40 retracts the pawls 42 from engagement with the windows 44a. The pawls 42 may also retract from windows 44b, though such is not required. Once the pawls 42 are disengaged from the windows 44a, the moveable rail 36 is free to slide relative to the stationary rail 34. Thus, the seat assembly 10 moves in a first direction that may be generally parallel to the floor 14, though relative movement in any direction may be provided. The first direction is typically in a fore and aft direction, as shown by the relative offset of the stationary rail 34 to the movable rail 36 in FIG. 1, though such is not required. When the desired position of the seat assembly 10 is determined, the release mechanism 46 may be actuated to reengage the pawls 42 with the windows 44a, thus substantially preventing further movement of the moveable rail 36 relative to the stationary rail 34.

When the seat track 12 is subjected to large forces, such as those that occur during high g-force events, the moveable rail 36 may be bent or otherwise deflected relative to the stationary rail 34. Such deflection or movement may be in the fore and aft direction. Alternatively, such deflection or movement may also be in a second direction that is different from the first direction, such as any angle relative to the plane of the floor 14. The deflections of the moveable rail 36 relative to the stationary rail 34 in the second direction may be produced by any single or combination of a bending, a torsional, or a shearing load, for example.

In operation, typically the deflections are generally first resisted by the slides 54, which is a primary contact point. As the forces become larger, the deflections may increase causing the J-hooks 52 and the tabs 48 to make contact. This forms a secondary contact point between the stationary rail 34 and the moveable rail 36. Once the cooperating J-hooks 52 and tabs 48 make contact, the bending loads are transmitted to both the slides 54 and the contacting J-hooks 52 and the tabs 48. Both the primary and secondary contact points facilitate preventing separation of the moveable rail 36 from the stationary rail 34. The secondary contact point provides a load sharing function and may also restrain or restrict the further deflection of the seat track 12. As such, the magnitude of the load on each pair of structures is lower than when only one pair of structures assumes the same load. The first embodiment moveable rail 36, shown in FIG. 2, is formed with a reinforced section 70 on each side 36a and 36b. The reinforced section 70 provides an increased stiffness characteristic to the moveable rail 36 to further minimize deflections and prevent separation from the stationary rail 34.

The stationary rail 34 may be made of metal, reinforced plastics, molded polymers, and the like and formed by any suitable process, such as stamping, forging, casting, extruding, molding, and the like. Likewise, the moveable rail 36 may be formed from a single piece extrusion or other suitable process such as those mentioned above, and may be made from, for example, a metal such as aluminum, steel, magnesium, titanium, and the like. Alternatively, the moveable rail 36 may also be made from reinforced plastics, composites, molded polymers, and the like.

When the seat track 12 is made of metal such as, for example, steel, the reinforced section 70 may be on the order of 2.0 millimeters to 3.0 millimeters in cross sectional thickness. Preferably, the reinforced section 70 may be 2.2 millimeters thick. The remaining portions of the moveable rail 36, such as the seat mounting side 36c, the J-hooks 52, and the inner races 65 may have thinner cross sectional thicknesses as compared to the reinforced portion 70 and the stationary rail 34. If desired, the thickness of the seat mounting side 36c may be on the order of 1.0 millimeter to 1.5 millimeters, and preferably 1.2 millimeters. The J-hooks 52 and the inner races 65 may be on the order of 0.8 millimeters to 1.5 millimeters thick, and preferably 1.0 millimeter thick. The stationary rail 34, including the windows 44a and the tabs 48, may be on the order of 1.0 millimeter to 1.5 millimeters thick, and preferably 1.3 millimeters in thickness. Other materials may be sized proportionally based on any suitable criteria such as, for example, yield strength, ultimate tensile strength, modulus of elasticity, and/or any other suitable measure of material performance, if desired.

Figure 4:
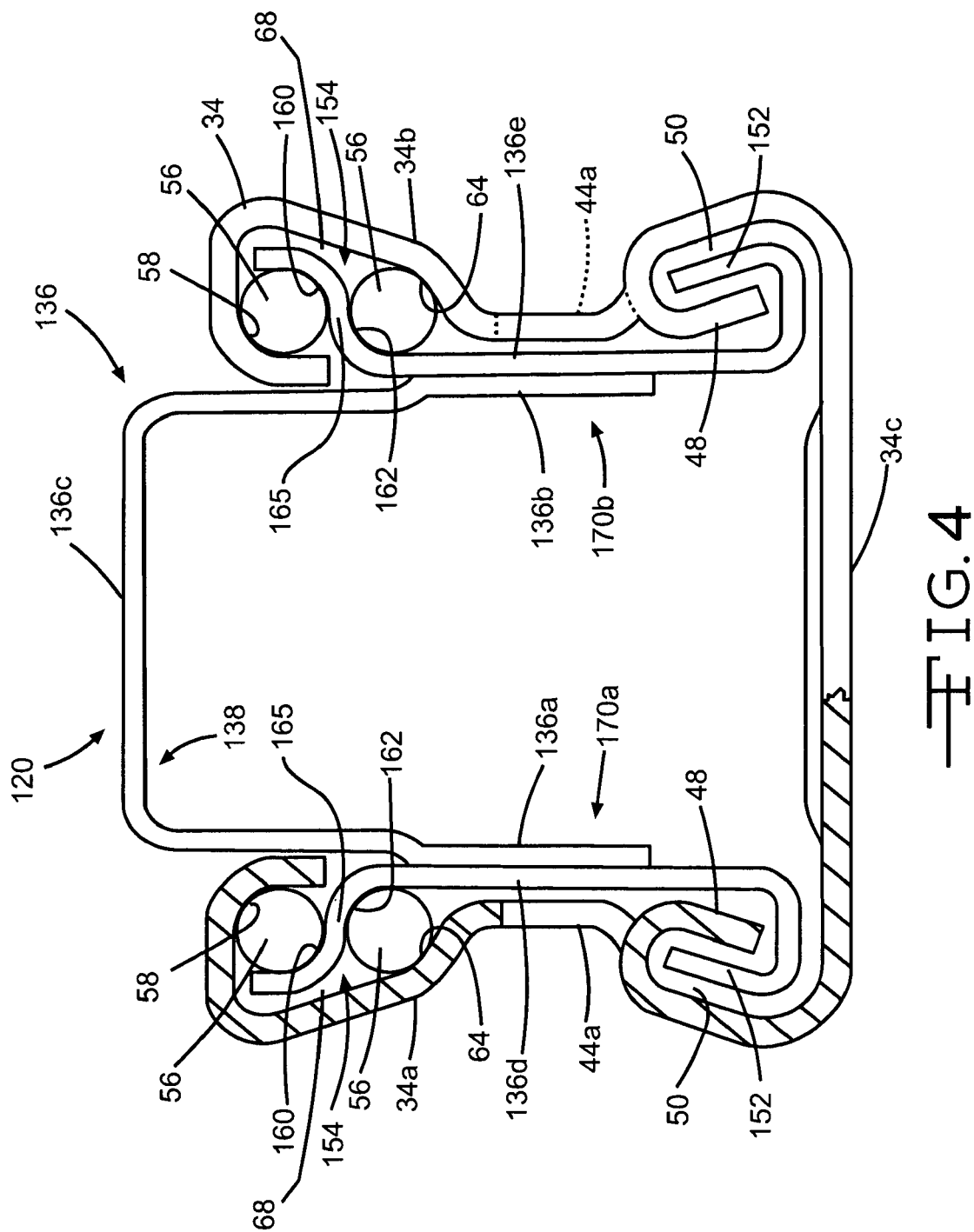
FIG. 4 is an elevational view, in partial cross section, of a second embodiment of the seat track assembly of FIG. 2.

Referring now to FIG. 4, there is illustrated a second embodiment of a seat track, shown generally at 120. The seat track 120 includes a moveable rail 136 that is engaged to the stationary rail 34 described above. The moveable rail 136 is similar to the moveable rail 36, and similar numbers are used to indicate similar structures and functions. The moveable rail 136 includes a first side or leg 136a and a second side or leg 136b extending from a seat mounting side 136c. The first, second, and seat mounting sides 136a, 136b, and 136c, respectively, define a center section 138. A first slide portion 136d engages the first leg 136a. The first slide portion 136d includes a J-hook 152 formed on one end and an inner race 165 formed on an opposing end. The inner race 165 includes bearing raceways 160 and 162 formed thereon, as described above. Similarly, a second slide portion 136e engages the second leg 136b. The second slide portion 136e may be a mirror image of the first slide portion 136d, though such is not required. The moveable rail 136 engages and cooperates with the stationary rail 34 in the same manner as the moveable rail 36, described above.

The center section 138 of the moveable rail 136 may be made from a metal stamping such as, for example, a steel stamping. Likewise, the first and second slides 136d and 136e, respectively, may also be made from metal stampings such as, for example, steel stampings. Alternatively, the center part 138 and the outer sides 136d and 136e may be made from other metals such as, for example, aluminum, magnesium, and titanium, and by other processes such as, for example, extrusion, casting, forging, and the like. The center part 138 and the outer sides 136d and 136e may further be made from non-metallic materials such as, for example, reinforced plastics or molded polymers and made by any suitable process such as, for example, pultrusion, extrusion, injection molding, resin transfer molding, and the like. The first and second slides 136d and 136e, respectively, may be attached to the first and second legs 136a and 136b, respectively, by any suitable process.

The moveable rail 136 further includes reinforced sections 170a and 170b. The reinforced section 170a is formed by the overlapping portions of the first slide 136d with the first leg 136a. The reinforced section 170b is formed by the overlapping portions of the second slide 136e with the second leg 136b. The remaining portions of the moveable rail 136, such as the seat mounting side 136c, the J-hooks 152, and the inner races 165 may have a thinner cross section relative to the reinforced sections 170a and 170b. The reinforced sections 170a and 170b function in a similar manner to reinforced section 70 described above. In the instance where the seat track 12 is made of metal such as, for example, steel, the reinforced sections 170a and 170b may be on the order of 2.0 millimeters to 3.0 millimeters in cross sectional thickness. Preferably, the sections 170a and 170b may be 2.2 millimeters thick. The center section 138 may have a thinner cross section relative to the reinforced sections 170a and 170b and the stationary rail 34. If desired, the cross sectional thickness of the center section 138 may be on the order of 1.0 millimeter to 1.5 millimeters, and preferably 1.2 millimeters.

The first and second slides 136d and 136e, respectively, may have a cross sectional thickness on the order of 0.8 millimeters to 1.5 millimeters, and preferably 1.0 millimeter. In the embodiment shown in FIG. 4, the center section 138 and the outer sides 136d and 136e are assembled together by laser welds positioned at the ends of the reinforced sections 170a and 170b, though any suitable attachment process may be used. The J-hooks 152 and the inner races 165 may have a cross sectional thickness that is on the order of 0.8 millimeters to 1.5 millimeters, and preferably 1.0 millimeter. The stationary rail 34, including the windows 44a and the tabs 48, may have a thickness on the order of 1.0 millimeter to 1.5 millimeters, and preferably 1.3 millimeters. Other materials may be sized as desired and based on any suitable criteria, such as yield strength, ultimate tensile strength, modulus of elasticity, and/or any other measure of material performance.

The principle and mode of operation of this invention have been explained and illustrated in its preferred embodiment. However, it must be understood that this invention may be practiced otherwise than as specifically explained and illustrated without departing from its spirit or scope.

What is claimed is:
1. A seat track comprising:
a stationary rail having a wall, a plurality of windows formed in the wall and a plurality of tabs, wherein each tab extends from each window; and
a moveable rail having a catch, wherein the moveable rail is supported on the stationary rail for relative movement in a first direction defining a seat positioning direction, and wherein the catch extends between the wall and the plurality of tabs and cooperates with the plurality of tabs to restrict relative movement of the moveable rail and the stationary rail in a second direction that is different from the first direction.

2. The seat track of claim 1 wherein the stationary rail is fixed to an anchoring member and the moveable rail is fixed to a portion of a seat.

3. The seat track of claim 2 wherein the first direction is generally parallel to a plane defined by the anchoring member, and wherein the cooperating plurality of tabs and the catch restrict movement only in the second direction.

4. The seat track of claim 1 wherein the stationary rail includes a first side, a second side, and an anchoring side, and wherein the wall is one of the first side and the second side and wherein the plurality of tabs extends between the first and second sides.

5. The seat track of claim 4 wherein a slot is defined between the plurality of tabs and one of the first and second sides, and wherein the catch is disposed within the slot.

6. The seat track of claim 1 wherein the stationary rail includes an outer race defining a cavity, the moveable rail includes an inner race disposed within the cavity and moveable relative to the outer race in the first direction.

7. The seat track of claim 6 wherein the outer race and the inner race each includes a bearing raceway and a ball bearing disposed between the bearing raceways.

8. The seat track of claim 1 wherein the moveable rail includes a first side, a second side, a seat mounting side, and a reinforced section that is thicker than the seat mounting side.

9. The seat track of claim 8 wherein the first and the second sides are first and second legs, and the reinforced section is formed by one of a first slide and a second slide engaged in an overlapping relationship with one of the first and second legs.

10. The seat track of claim 8 wherein the moveable rail is formed as a single piece rail, the reinforced section formed integrally with one of the first and second sides.

* * * * *